(12) United States Patent
Al-Saleh et al.

(10) Patent No.: US 11,169,287 B2
(45) Date of Patent: Nov. 9, 2021

(54) METHOD AND SYSTEM FOR AUTOMATED VELOCITY MODEL UPDATING USING MACHINE LEARNING

(71) Applicant: SAUDI ARABIAN OIL COMPANY, Dhahran (SA)

(72) Inventors: Saleh Mohammed Al-Saleh, Dhahran (SA); Ewenet Gashawbeza, Dhahran (SA); Yi Luo, Dhahran (SA); Jianwu Jiao, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 16/833,289

(22) Filed: Mar. 27, 2020

(65) Prior Publication Data
US 2021/0302606 A1 Sep. 30, 2021

(51) Int. Cl.
*G01V 1/28* (2006.01)
*G06N 3/04* (2006.01)
(Continued)

(52) U.S. Cl.
CPC ............ *G01V 1/282* (2013.01); *G01V 1/288* (2013.01); *G01V 1/34* (2013.01); *G06N 3/04* (2013.01);
(Continued)

(58) Field of Classification Search
USPC ........................................... 702/16
See application file for complete search history.

(56) References Cited

U.S. PATENT DOCUMENTS

| 5,265,068 A * | 11/1993 | Wang ............... G01V 1/282 367/73 |
| 5,640,368 A | 6/1997 | Krebs |

(Continued)

FOREIGN PATENT DOCUMENTS

| WO | 2011056347 A1 | 5/2011 |
| WO | 2018148492 A1 | 8/2018 |
| WO | 2019055565 A1 | 3/2019 |

OTHER PUBLICATIONS

Araya-Polo, Mauricio et al., "Deep-learning tomography", The Leading Edge, Jan. 2018, pp. 58-66 (9 pages).
(Continued)

*Primary Examiner* — Paul D Lee
(74) *Attorney, Agent, or Firm* — Osha Bergman Watanabe & Burton LLP

(57) ABSTRACT

A method may include obtaining an initial velocity model regarding a subterranean formation of interest. The method may further include generating various seismic migration gathers with different cross-correlation lag values based on a migration-velocity analysis and the initial velocity model. The method may further include selecting a predetermined cross-correlation lag value automatically using the seismic migration gathers and based on a predetermined criterion. The method may further include determining various velocity boundaries within the initial velocity model using a trained model, wherein the trained model is trained by human-picked boundary data and augmented boundary data. The method may further include updating, by the computer processor, the initial velocity model using the velocity boundaries, the automatically-selected cross-correlation lag value, and the migration-velocity analysis to produce an updated velocity model. The method may further include (Continued)

generating an image of the subterranean formation of interest using the updated velocity model.

19 Claims, 9 Drawing Sheets

(51) Int. Cl.
  *G06N 3/08*    (2006.01)
  *G01V 1/34*    (2006.01)
(52) U.S. Cl.
  CPC ....... *G06N 3/08* (2013.01); *G01V 2210/6222* (2013.01)

(56) References Cited

U.S. PATENT DOCUMENTS

| | | | |
|---|---|---|---|
| 6,438,493 | B1 | 8/2002 | West et al. |
| 10,782,430 | B2* | 9/2020 | Soubaras ............... G01V 1/307 |
| 2011/0002194 | A1 | 1/2011 | Imhof et al. |
| 2011/0320180 | A1* | 12/2011 | Al-Saleh ............... G01V 1/303 |
| | | | 703/6 |
| 2012/0069713 | A1 | 3/2012 | Geerits et al. |
| 2015/0293248 | A1 | 10/2015 | Etgen et al. |
| 2015/0316673 | A1 | 11/2015 | Wiener et al. |
| 2019/0011582 | A1 | 1/2019 | Aarre |
| 2019/0011583 | A1 | 1/2019 | Ray et al. |
| 2019/0383965 | A1 | 12/2019 | Salman et al. |

OTHER PUBLICATIONS

Long, Andrew, "Machine Learning and Related Applications to Seismic", Industry Insights, A Clearer Image, PGS, Apr. 2019, pp. 1-4 (4 pages).

Øye, O.K. and E.K. Dahl, "Velocity model building from raw shot gathers using machine learning", Th VW 11, Second EAGE/PESGB Workshop on Velocities, PES GB, Apr. 2019 (3 pages).

Wu, Xinming et al., "Convolutional neural networks for fault interpretation in seismic images", SEG International Exposition and 88th Annual Meeting, SET, 2018, pp. 1946-1950 (5 pages).

International Search Report issued in corresponding International Application No. PCT/US2020/031598, dated Dec. 22, 2020 (5 pages).

Written Opinion issued in corresponding International Application No. PCT/US2020/031598, dated Dec. 22, 2020 (9 pages).

Smith, K.J., 2017, Machine learning assisted auto-picking, SEG International Exposition and 87th Annual Meeting, 5686-5690 (5 pages).

Paolo, B., Lipari, V., Tubaro, S., 2017, A machine learning approach to facies classification using well logs, SEG International Exposition and 87th Annual meeting, 2137-2142 (5 pages).

Saleh M. Al-Saleh and Jianwu Jiao, 2012, MVA using wavefield tomography, Geophysics, 77, No. 5, p. U73-U85, doi: 10.1190/GEO2011-0440.1 (13 pages).

Al-Saleh, S., J. Jiao, and A. Fox, 2011, Migration velocity analysis using the common image cube (CIC): Geophysics, 76, No. 5, WB127-WB134, doi: 10.1190/geo2010-0387.1 (8 pages).

Luo, Y., and G. Schuster, 1991, Wave-equation traveltime inversion: Geophysics, 56, 645-653, doi: 10.1190/1.1443081 (9 pages).

Fangashu, Yang and Jianwei Ma., 2019, Deep-learning inversion: A next-generation seismic velocity model building method, Geophysics, 84, No. 4, p. R583-R589 doi: 10.1190/GEO2018-0249.1 (17 pages).

Ronneberger, Olaf "U-Net: Convolutional Networks for Biomedical Image Segmentation" Computer Science Department and BIOSS Centre for Biological Signalling Studies, University of Freiburg, Germany ronneber@informatik.uni-freiburg.de (8 pages).

* cited by examiner

METHOD AND SYSTEM FOR AUTOMATED VELOCITY MODEL UPDATING USING MACHINE LEARNING

BACKGROUND

During migration algorithms for converting time-based seismic data into a depth representation of a subsurface, geologists may manually determine velocity boundaries in advance of performing a complete migration-wavefield inversion. However, identifying velocity boundaries may be a very time-consuming operation due to the required skills of the human operator as well as the limitations of using human operators to perform a data-intensive task.

SUMMARY

In general, in one aspect, embodiments relate to a method that includes obtaining, by a computer processor, an initial velocity model regarding a subterranean formation of interest. The method further includes generating, by the computer processor, various seismic migration gathers with different cross-correlation lag values based on a migration-velocity analysis and the initial velocity model. The method further includes selecting, by the computer processor, a predetermined cross-correlation lag value automatically using the seismic migration gathers and based on a predetermined criterion. The method further includes determining, by the computer processor, various velocity boundaries within the initial velocity model using a trained model, wherein the trained model is trained by human-picked boundary data and augmented boundary data. The method further includes updating, by the computer processor, the initial velocity model using the velocity boundaries, the automatically-selected cross-correlation lag value, and the migration-velocity analysis to produce an updated velocity model. The method further includes generating, by the computer processor, an image of the subterranean formation of interest using the updated velocity model.

In general, in one aspect, embodiments relate to a method that includes obtaining, by a computer processor, first human-picked boundary data that describes a first set of velocity boundaries within a first migrated seismic image. The method further includes obtaining, by the computer processor, augmented boundary data that describes a second set of velocity boundaries within a second migrated seismic image, wherein the augmented boundary data is generated from second human-picked boundary data using an augmentation operation. The method further includes generating, by the computer processor, a trained model using various machine-learning epochs and training data including the first human-picked boundary data and the augmented boundary data. The method further includes determining, by the computer processor, one or more velocity boundaries using the trained model and migrated seismic data.

In general, in one aspect, embodiments relate to a non-transitory computer readable medium storing instructions executable by a computer processor. The instructions obtain an initial velocity model regarding a subterranean formation of interest. The instructions further generate various seismic migration gathers with different cross-correlation lag values based on a migration-velocity analysis and the initial velocity model. The instructions further select a predetermined cross-correlation lag value automatically using the seismic migration gathers and based on a predetermined criterion. The instructions further determine various velocity boundaries within the initial velocity model using a trained model, wherein the trained model is trained by human-picked boundary data and augmented boundary data. The instructions further update the initial velocity model using the velocity boundaries, the automatically-selected cross-correlation lag value, and the migration-velocity analysis to produce an updated velocity model. The instructions further generate an image of the subterranean formation of interest using the updated velocity model.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for automating velocity model updates. In particularly, some embodiments include obtaining a set of migration gathers to identify the optimum cross-correlation lag value for a final velocity model. For example, the set of migration gathers may be performed using a migration-velocity analysis, such as reverse time migration. Using a selected cross-correlation lag value, a trained model may then be used to predict velocity boundaries within an initial velocity model. For example, the trained model may be a machine-learning model that uses migrated depth images based on seismic data to classify velocity boundaries for completing tomographic update of the initial velocity model.

Furthermore, some embodiments use machine learning, automatic velocity picking, and wave-equation tomography to build a subsurface model having a complex geological environment from acquired seismic survey data. For example, subsalt exploration may be complex due to the complicated subsurface geological structures of salt bodies and the high drilling costs associated with drilling through such complex geological structures. Thus, some embodiments provide an automated workflow for overcoming the complexity associated with various geological environments for hydrocarbon exploration and production.

Figure 1:
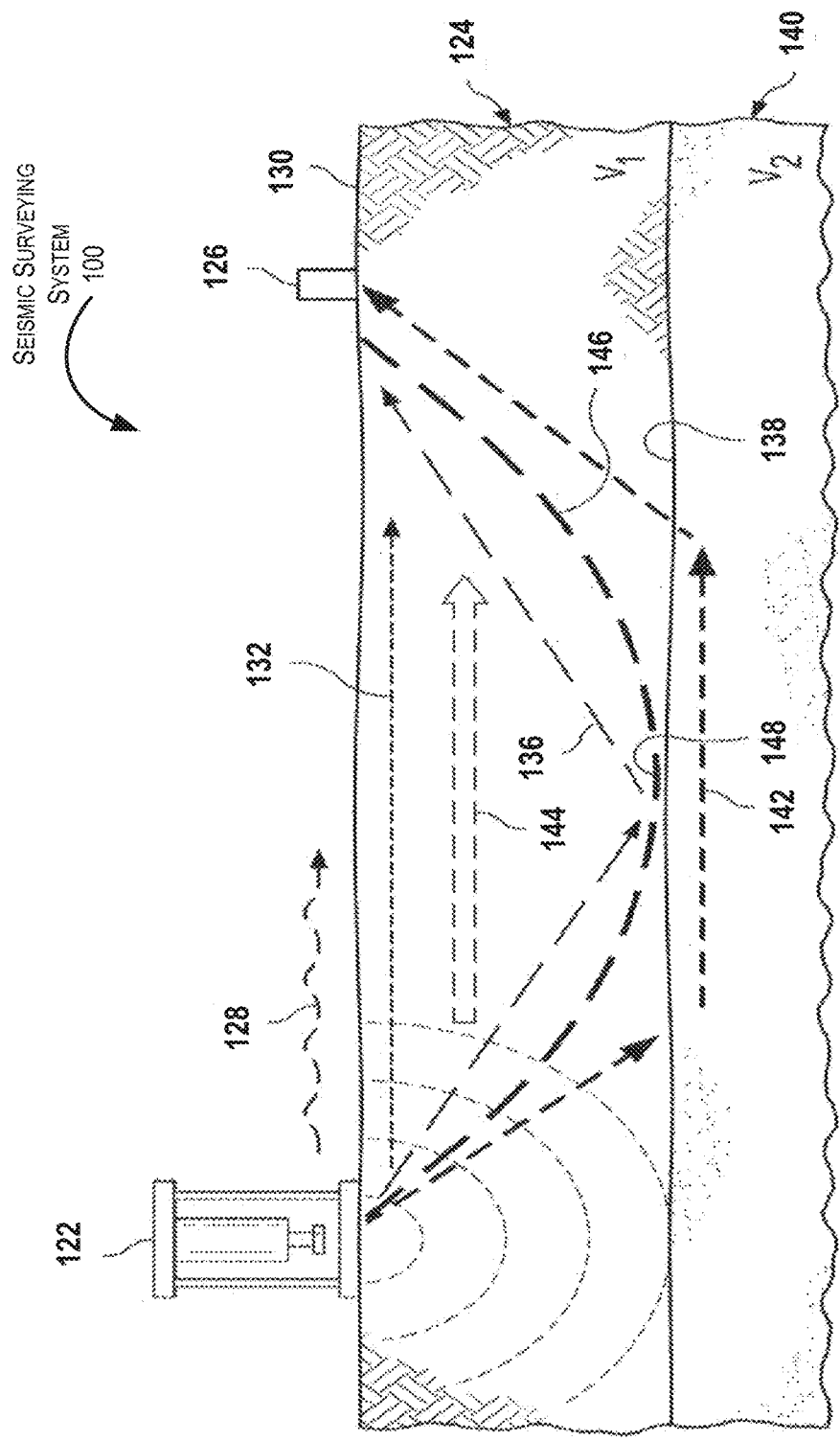
FIGS. 1 and 2 show systems in accordance with one or more embodiments.

Turning to FIG. 1, FIG. 1 shows a schematic diagram in accordance with one or more embodiments. As shown in FIG. 1, FIG. 1 illustrates a seismic survey system (100) and the resultant paths of pressure waves (also called seismic waves). The seismic survey system (100) includes a seismic source (122) that includes functionality for generating pressure waves, such as a reflected wave (136), diving wave A (142), or diving wave B (146), through a subsurface layer (124). Pressure waves generated by the seismic source (122) may travel along several paths through a subsurface layer (124) at a particle velocity $V_1$ for detection at a number of seismic receivers (126) along the line of profile. Likewise, particle velocity may refer to multiple velocities types, such as the two types of particle motions resulting from a seismic wave, i.e., velocity of the primary wave and a different velocity of the secondary wave through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) also emits surface waves (132), which travel along the earth's surface (130). The speed of the surface waves (132), also called Rayleigh waves or ground roll, may correspond to a particle velocity typically slower than the velocity of a secondary wave. While the seismic survey shown in FIG. 1 is a two-dimensional survey along a seismic line of profile along a longitudinal direction, other embodiments are contemplated, such as three-dimensional surveys.

Furthermore, subsurface layer (124) has a particle velocity $V_1$, while subsurface layer (140) has a particle velocity $V_2$. A particle velocity may refer to the speed that a pressure wave travels through a medium, e.g., diving wave B (146) that makes a curvilinear ray path (148) through subsurface layer (124). Particle velocity may depend on a particular medium's density and elasticity as well as various wave properties, such as the frequency of an emitted pressure wave. Where particle velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the particle velocity $V_1$ through the subsurface layer (124) to the seismic receivers (126).

Turning to refracted pressure waves, the seismic source (122) may also generate a refracted wave (i.e., diving wave A (142)) that is refracted at the subsurface interface (138) and travels along the subsurface interface (138) for some distance as shown in FIG. 1 until traveling upwardly to the seismic receivers (126). As such, refracted pressure waves may include diving waves (e.g., diving wave A (142), diving wave B (146)) that may be analyzed to map the subsurface layers (124, 140). For example, a diving wave may be a type of refracted wave that is continuously refracted throughout an earth's subsurface. Thus, a diving wave may be generated where particle velocities are gradually increasing with depth at a gradient. Likewise, the apex of a diving wave may be offset from a common midpoint (CMP) in contrast to reflected seismic energy. Though, for analysis purposes, an apex of a diving wave may be regarded as a common midpoint for the refracted energy. As such, the apex may serve as the basis for organizing and sorting a seismic survey dataset.

Furthermore, in analyzing seismic data acquired using the seismic surveying system (100), seismic wave propagation may be approximated using rays. For example, reflected waves (e.g., reflected wave (136)) and diving waves (e.g., diving waves (142, 146)) may be scattered at the subsurface interface (138). In FIG. 1, for example, the diving wave B (146) may exhibit a ray path of a wide angle that resembles a reflected wave in order to map the subsurface. Using diving waves, for example, a velocity model for an underlying subsurface may be generated that describes the particle velocity of different subsurface layers.

Figure 2:
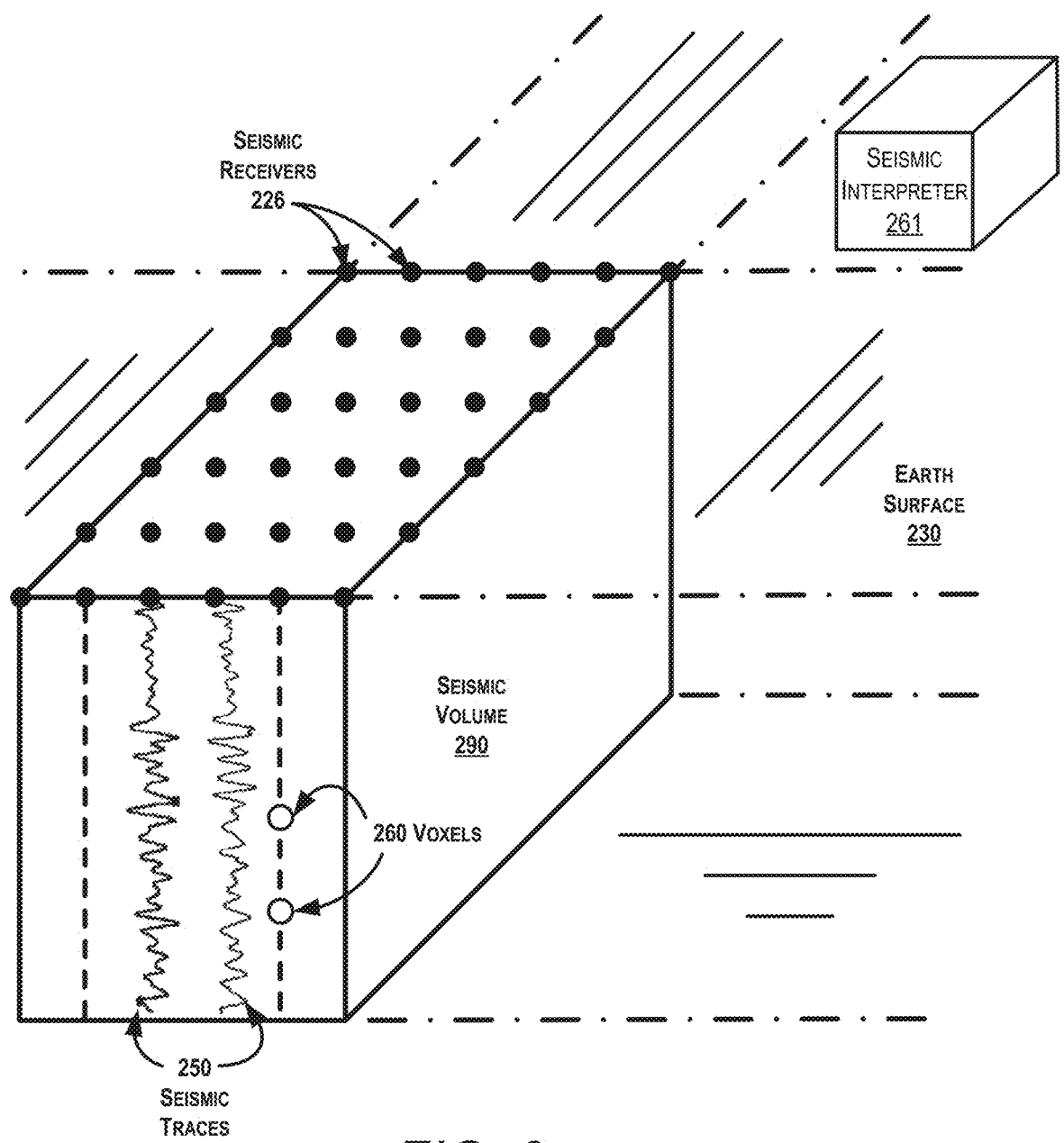

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a three-dimensional cubic data set of seismic traces. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to time domain data acquired seismic data from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some embodiments, seismic data may also refer to depth data. For example, seismic data may be processed, e.g., using a seismic inversion operation, to generate a velocity model of a subterranean formation, or a migrated seismic image of a rock formation within the earth's surface.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Turning to the seismic interpreter (261), a seismic interpreter (261) may include a processor and hardware and/or software with functionality for generating one or more machine-learning models for analyzing a subterranean formation. For example, the seismic interpreter (261) may store the seismic volume (290), well logs, and core sample data, and further analyze the well log data, the core sample data, seismic data, and/or other types of data to generate and/or update the one or more machine-learning models. For example, different types of models may be trained, such as support vector machines, decision trees, inductive learning models, deductive learning models, supervised learning models, etc. While the seismic interpreter (261) is shown at a seismic surveying site, in some embodiments, the seismic interpreter (261) may be remote from a seismic surveying site.

In some embodiments, the seismic interpreter (261) may include functionality for applying deep learning methodologies to precisely analyze various subsurface layers. To do so, a large amount of interpreted data may be used to train a model. To obtain this amount of data, the seismic interpreter (261) may augment acquired data, such as seismic data. In some embodiments, a seismic interpreter (261) may use data augmentation to generate a dataset that combines original acquired data with augmented data to provide sufficient training data to train a model accordingly. In some embodiments, the seismic interpreter (261) may include a computer system that is similar to the computer system (700) described below with regard to FIGS. 7A and 7B and the accompanying description.

Figure 3:
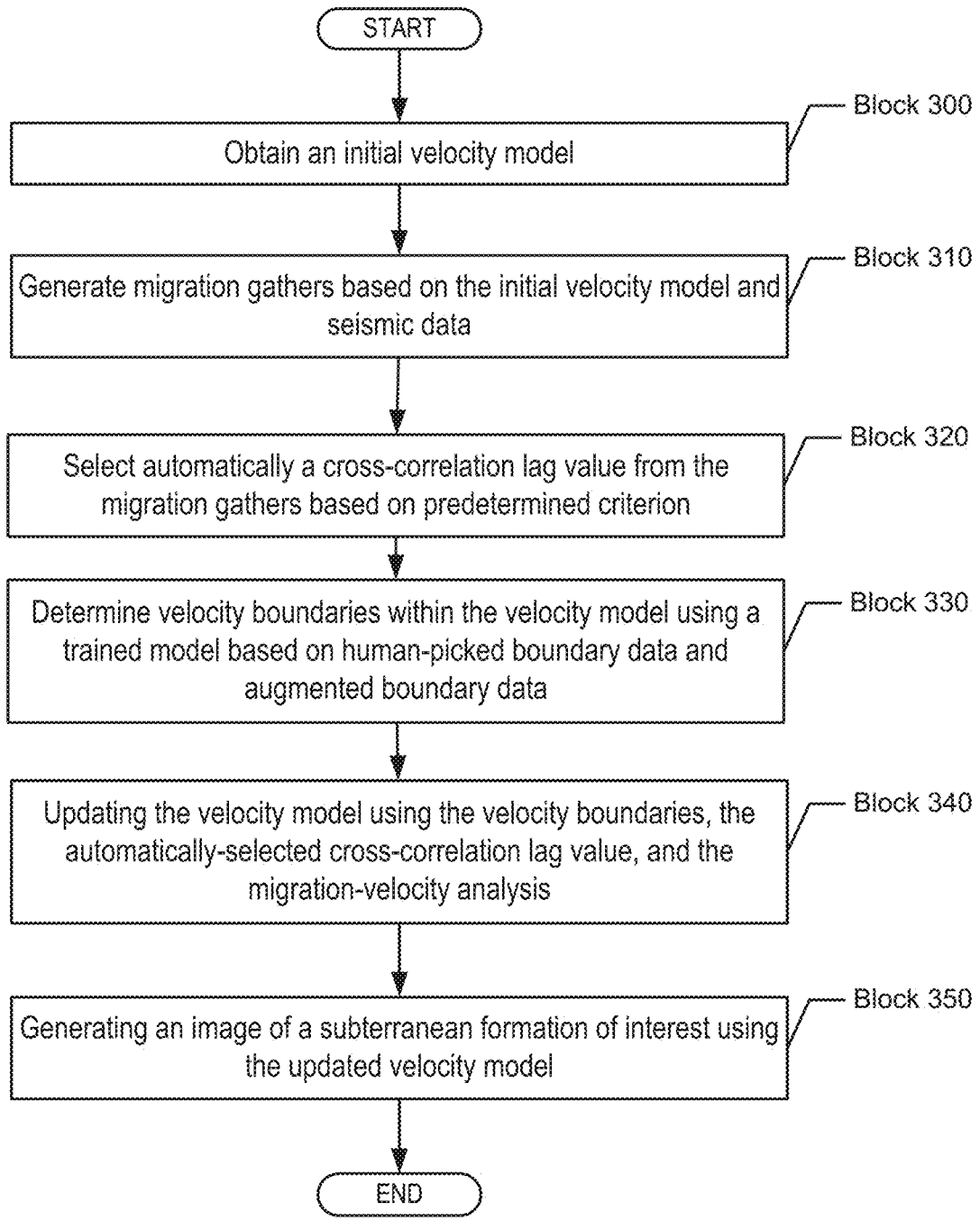
FIG. 3 shows a flowchart in accordance with one or more embodiments.

Turning to FIG. 3, FIG. 3 shows a flowchart in accordance with one or more embodiments. Specifically, FIG. 3 describes a general method for updating a velocity model and/or generating a seismic image using the updated velocity model. One or more blocks in FIG. 3 may be performed by one or more components (e.g., seismic interpreter (261)) as described in FIGS. 1-2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, an initial velocity model is obtained in accordance with one or more embodiments. For example, a velocity model may describe particle velocities at different regions within a subsurface. An initial velocity model may be generated by modeling the velocity structure of media in the subsurface using a form of inversion of seismic data, typically referred to as seismic inversion. In seismic inversion, a velocity model is iteratively improved until the velocity model and the seismic data are in agreement, e.g., the solution of the velocity model converges to a global optimum that satisfies a particular criterion.

In Block 310, various migration gathers are generated based on an initial velocity model and seismic data in accordance with one or more embodiments. For example, time-lag migration gathers may be generated based on an initial velocity model, e.g., the initial velocity model from Block 300. A gather may include a collection of input traces (e.g., seismic traces) made according to some trace header parameter. A migration gather may be the result of a migration-velocity analysis being applied to traces in a gather. Before implementing a complete tomographic inversion of the initial velocity model, for example, migration gathers may be generated using reverse-time migration (RTM) or phase-shift-plus-interpolation (PSPI) method with various cross correlation time lags. Thus, multiple volumes of stacked images may be generated in a migration gather for different cross correlation lag values.

In some embodiments, various nonzero-lag common image gathers (CIG) are generated using a cross-correlation imaging condition, which combine to form a common image cube (CIC). Slicing the CIC at different cross-correlation lag values may generate a series of CIGs. Thus, flattened events may occur in the CIGs at a cross-correlation lag other than the zero-lag when an incorrect velocity model is being used in a migration algorithm.

In some embodiments, the migration gathers smoothed using a smoothing function. For example, migrated gathers may be generated at each surface location and smoothed spatially along local dips within a sliding (i.e., moving) window. On the smoothed gathers, the highest amplitude coherent energy may be selected. Due to the "smoothing", highest amplitudes may be coherent or continuous among adjacent locations in a respective gather. Smoothing may also reduce the noise from the gathers.

In Block 320, a cross-correlation lag value is automatically selected from various migration gathers based on a predetermined criterion in accordance with one or more embodiments. For example, a cross-correlation lag value may correspond to a correlation shift $\Delta\tau$ in a cross-correlation equation. More specifically, a correlation shift $\Delta\tau$ may be used in various migration-velocity analysis techniques to update an initial velocity model or generate migration gathers.

In some embodiments, for example, a seismic interpreter may automatically select a cross correlation lag value by analyzing a maximum stacked response among various migration gathers. In particular, the maximum stacked response may describe the highest degree of continuity and amplitude coherent energy among the different migration gathers based on different cross-correlation lag values. As such, the criterion may be the highest amplitude coherent energy among the migration gathers. Likewise, the criterion may also correspond to a predetermined degree of coherent energy within the migration gathers.

In some embodiments, a seismic interpreter analyzes a CIG to determine a cross-correlation lag value at a focusing depth in which an event in the CIG is flattest. As such, the seismic interpreter may model a Green's function by seeding a source at the focusing depth using one-way wave-equation tomography. In particular, the seismic interpreter may shift a modeled wavefield with the corresponding cross-correlation lag value. This migration-velocity analysis process may be repeated for events in the CIGs at different lateral and vertical positions. The result of the migration-velocity analysis may be a set of velocity modeled data whose wavefield approximates the wavefield where the closest velocity model to the actual subsurface had been used to simulate these migration gathers.

In Block 330, various velocity boundaries are determined within a velocity model using a trained model based on human-picked boundary data and augmented boundary data in accordance with one or more embodiments. In some embodiments, for example, velocity horizons of a particular facies within the subsurface may be used for a tomographic update of an initial velocity model. Thus, velocity boundaries may be selected from an optimum stacked image based on the automatically-selected cross correlation lag value.

In some embodiments, a seismic interpreter uses a trained model to determine velocity boundaries of one or more subsurface layers or facies. For example, the trained model may be a convolutional neural network, such as a U-net model, that is trained using a machine-learning algorithm. Training may be performed using a training dataset based on human-picked boundary data and/or augmented boundary data. For more information on human-picked boundary data or augmented boundary data, see Blocks 510 and 520 below in FIG. 5 and the accompanying description. In some embodiments, for example, a trained model may obtain a migrated seismic image as an input and produces velocity boundaries as an output, e.g., in a velocity boundary map. For more information on trained models, see FIGS. 5 and 6 below and the accompanying description.

In some embodiments, top velocity boundaries and base velocity boundaries of a salt body are automatically determined within a subterranean formation. For example, a seismic interpreter may isolate salt bodies from non-salt bodies using an automated selection process. In particular, this automated selection process may use artificial intelligence for identifying these salt velocity boundaries for subsalt imaging. In contrast, velocity boundary picking may be performed manually by geologists over days or months. Through an automated selection process, a seismic interpreter may reduce the amount of time needed for generating optimum seismic images and thus increase resources for other areas. For example, by reducing the amount of time for determining velocity boundaries, better seismic images may be obtained. These better seismic images may increase the chances of finding oil and gas generated in complex environments, such as the Red Sea, which is considered one of the most complex geological basins of the world. Thus, the automated selection process may determine boundaries of complicated subsurface structures, thick salt deposits, and/or rugged seafloor topography that may prove problematic in forming accurate subsurface seismic images.

In Block 340, a velocity model is updated using various velocity boundaries, an automatically-selected cross-correlation lag value, and a migration-velocity analysis in accordance with one or more embodiments. For example, the velocity boundaries from Block 330 and the automatically-selected cross-correlation lag value may be inputs to a migration-velocity analysis for updating an initial velocity model. In some embodiments, the migration-velocity analysis is based on wave-equation traveltime tomography that may update the velocity model in the presence of various velocity errors and a complex environment. For example, in one or more embodiments, the migration-velocity analysis is one-way wave-equation tomography. In other embodiments, ray tracing or two-way wave-equation tomography may also be used to update a velocity model.

In Block 350, an image of a subterranean region of interest is generated using an updated velocity model in accordance with one or more embodiments. In some embodiments, the subterranean region of interest corresponds to an area of a subterranean formation that may be desired for further analysis, such as for a prospective drilling operation or reservoir modeling. Thus, the image may provide a spatial and depth illustration of a subterranean formation for various practical applications, such as predicting hydrocarbon deposits, predicting wellbore paths for geosteering, etc.

Figure 4A:
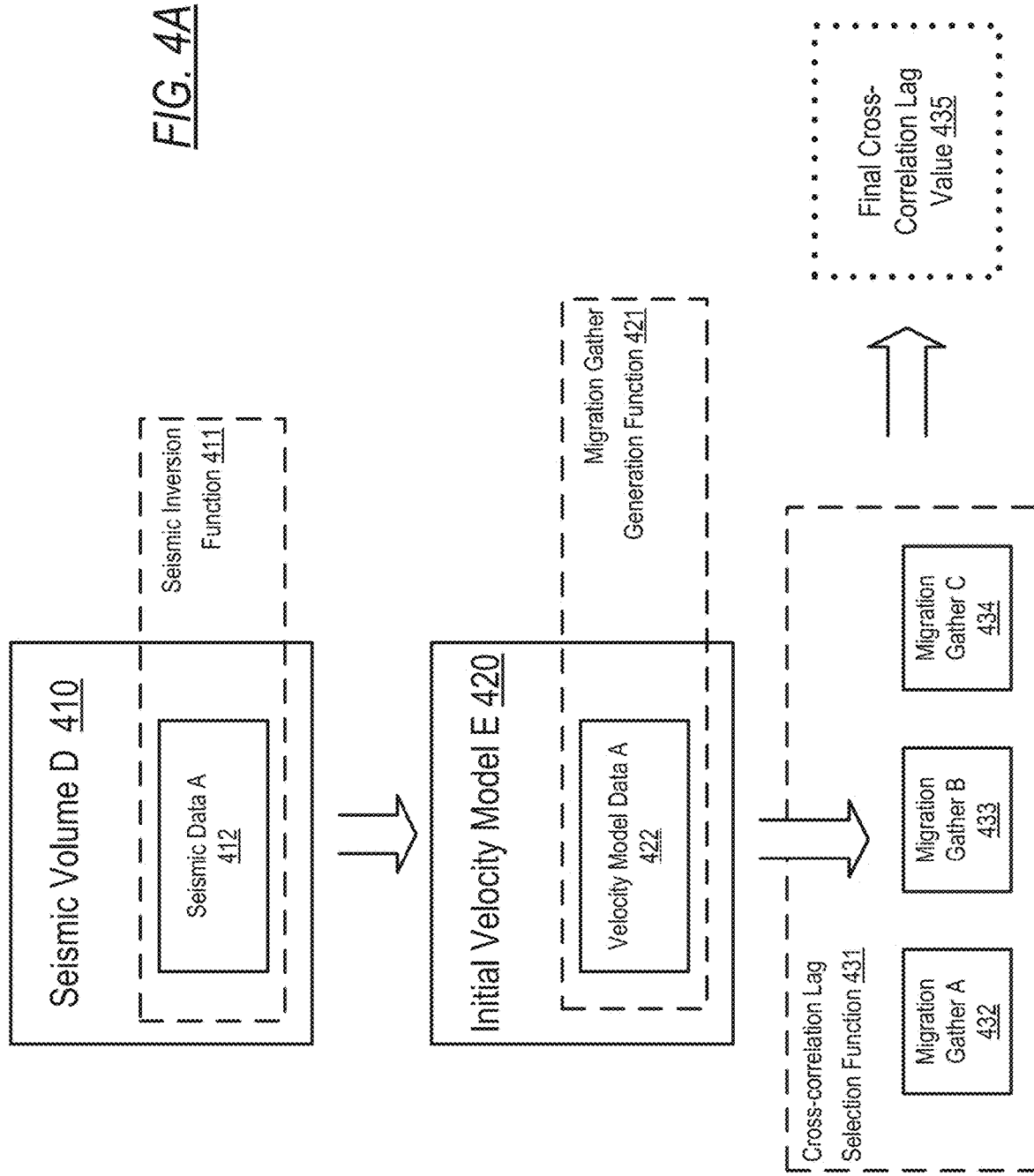
FIGS. 4A, 4B, and 4C show an example in accordance with one or more embodiments.
Figure 4B:
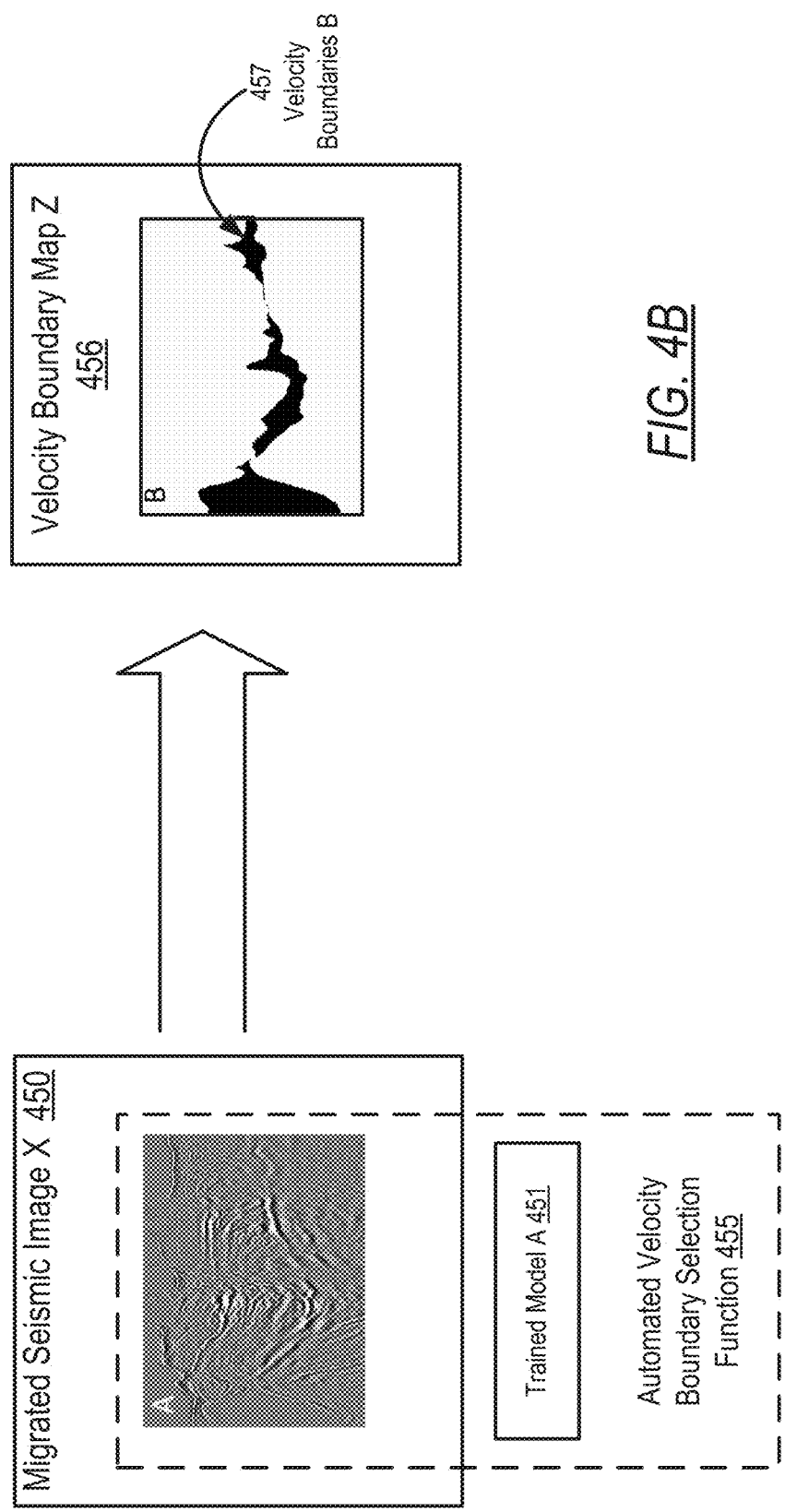
Figure 4C:
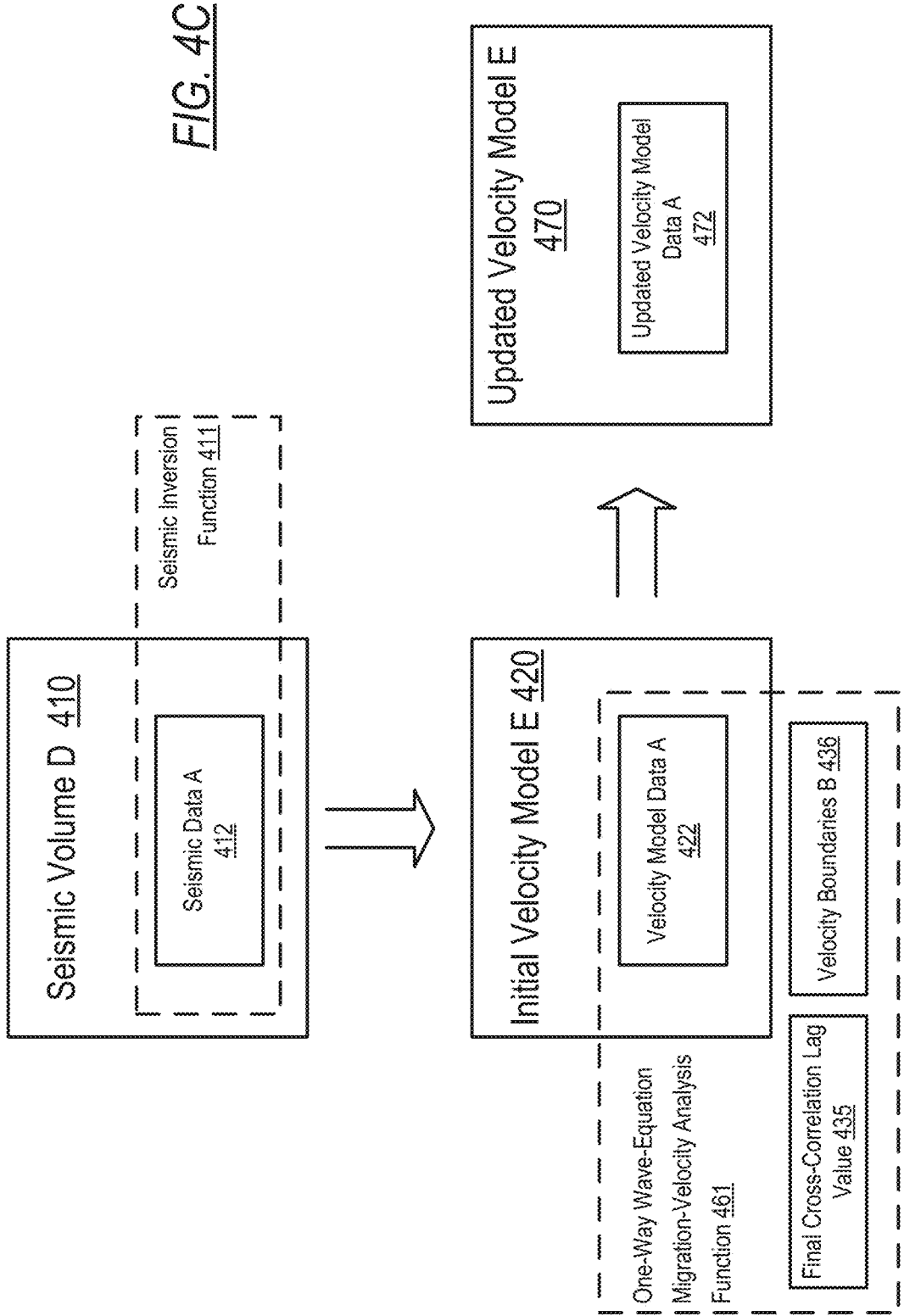

Turning to FIGS. 4A, 4B, and 4C, FIGS. 4A, 4B, and 4C provide an example of updating a velocity model through an automatic selection of a cross-correlation lag value and using a trained model to determine velocity boundaries. The following example is for explanatory purposes only and not intended to limit the scope of the disclosed technology.

In FIG. 4A, a seismic interpreter obtained seismic volume D (410). Using a seismic inversion function (411), seismic data A (412) in the seismic volume D (410) is used to generate an initial velocity model E (420) that includes velocity model data A (422). The seismic interpreter may use a migration gather generation function (421) that performs RTM or a PSPI method to generate various migration gathers (i.e., migration gather A (432), migration gather B (433), migration gather C (434)). The seismic interpreter may use an automated selection process (i.e., cross-correlation lag selection function (431)) on the migration gathers (432, 433, 434) to determine a final cross-correlation lag value (435). The final cross-correlation lag value (435) may correspond to the cross-correlation lag value that produced the highest coherent amplitude among the migration gathers (432, 433, 434), i.e., as the predetermined criterion.

Turning to FIG. 4B, a migration seismic image X (450) obtained from the initial velocity model E (420) using a migration-velocity analysis may be input to a trained model A (451). As such, a seismic interpreter may use an automated velocity boundary selection function (455) with the trained model A (451) to determine a velocity boundary map Z (456) from the migrated seismic image X (450). In particular, the velocity boundary map Z (456) includes various velocity boundaries B (457) that correspond to various salt bodies deposited within a subterranean region that is illustrated in the migrated seismic image X (450).

Turning to FIG. 4C, the initial velocity model E (420) is updated using a migration-velocity analysis. Here, one-way wave-equation tomography is performed on the initial velocity model E (420) using the final cross-correlation lag value (435) from FIG. 4A and the velocity boundaries B (436) from FIG. 4B in a one-way wave-equation migration-velocity analysis function (461). The output of the migration-velocity analysis function (461) is an updated velocity model E (470) that includes updated velocity model data A (472).

Figure 5:
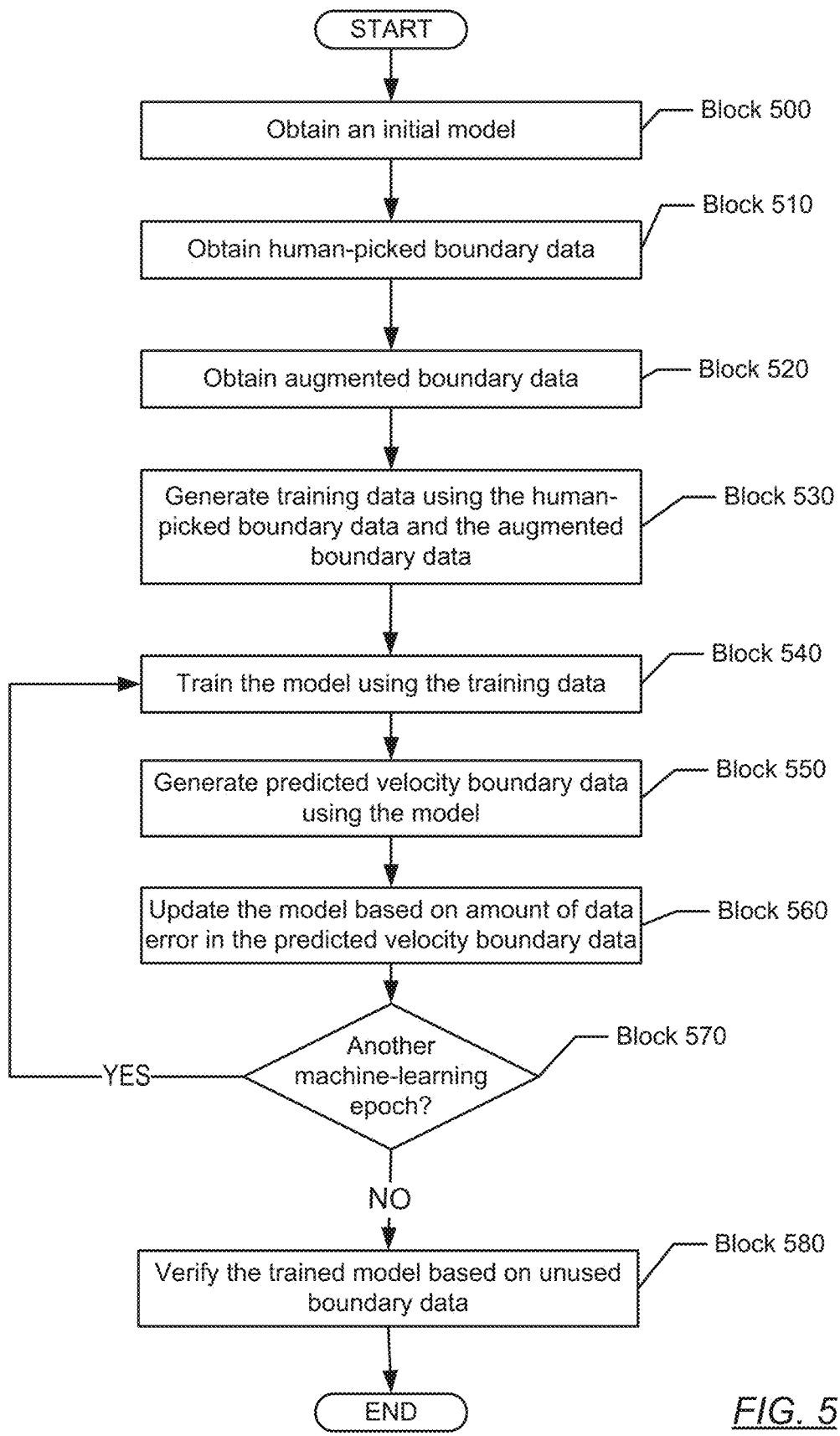
FIG. 5 shows a flowchart in accordance with one or more embodiments.

Turning to FIG. 5, FIG. 5 shows a flowchart in accordance with one or more embodiments. Specifically, FIG. 5 describes a method for generating and/or verifying a trained model. One or more blocks in FIG. 5 may be performed by one or more components (e.g., seismic interpreter (261)) as described in FIGS. 1-2. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, an initial model is obtained in accordance with one or more embodiments. Initially, the model may be obtained and initialized with weights and/or biases prior to training. In particular, the model may be a machine learning model that is capable of approximating solutions of complex non-linear problems. For example, a machine-learning model may be a neural network model. In particular, a neural network model may include one or more hidden layers, where a hidden layer includes one or more neurons. A neuron may be a modelling node that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining a specified output of the neural network. Likewise, these weighted data inputs may be summed such that this sum is communicated through a neuron's activation function (e.g., a sigmoid function) to other hidden layers within the neural network. As such, the activation function may determine whether and to what extent an output of a neuron progresses to other neurons in the model. Likewise, the output of a neuron may be weighted again for use as an input to the next hidden layer.

In some embodiments, the model is a U-Net model. More specifically, a U-net model is a type of convolutional neural network that may have a deep neural network architecture. For example, a U-Net model may include functionality for classifying and/or segmenting images. In a deep neural network, a layer of neurons may be trained on a predetermined list of features based on the previous network layer's output. Thus, as data progress through the deep neural network, more complex features may be identified within the data by neurons in later layers. Likewise, a convolutional neural network may include various convolutional layers, pooling layers, fully connected layers, and/or normalization layers to produce a particular type of output. Thus, convolution and pooling functions may be the activation functions within a convolutional neural network. For more information on U-net models, see FIG. 6 below and the accompanying description.

In Block 510, human-picked boundary data is obtained in accordance with one or more embodiments. For example, a geologist may analyze various migrated seismic images to select manually velocity boundaries, such as salt boundaries. This manual classification by human may correspond to human-picked boundary data, which may include both the underlying migrated seismic data being analyzed and velocity boundary data, such as a velocity boundary map. Thus, to generate human-picked boundary data, a time-consuming process may be performed that requires one or more months of human time depending on the size of the seismic survey. Likewise, multiple human-picking iterations may be required in order to update gradually a velocity model. Thus, in some embodiments, human-picked boundary data may be obtained from legacy data that may include data from multiple seismic surveys regarding simple and/or complex subterranean formations. Human-picked velocity boundaries could also be obtained from previous iterations of seismic images which are generated in the same area or from adjacent areas.

In Block 520, augmented boundary data is obtained in accordance with one or more embodiments. For example, data augmentation may include performing various processes on acquired human-picked boundary data, such as log cropping or adding noise, in order to generate augmented boundary data. In particular, data augmentation may introduce various machine-learning algorithms to uncommon problems in order to increase a trained model's ability to predict velocity boundaries. Likewise, data augmentation may be performed in order to generate an extended dataset sufficient to train a model. For example, a data augmentation process may alter a normal seismic dataset to produce a different or more complex seismic dataset. Through such augmented boundary data, an artificial intelligence model may be made immune to various abnormalities in velocity-boundary picking.

In some embodiments, a data augmentation process may include a random modification where migrated seismic data is modified data from an original state to a modified one. Data augmentation may also include a smoothing operation to remove data spikes within human-picked boundary data, such as through resampling or smoothing the data. In another embodiment, data augmentation may include an intrusion operation where random values are added to the human-picked boundary data in specific areas depending on the type of augmenting factor. In another embodiment, data augmentation may include a random noise operation that adds noise in different amounts to different depths of a migrated seismic image. Such added noise may increase the complexity of velocity boundary picking and thus the boundary data. In another embodiment, data augmentation includes a cut operation that remove velocity boundary data randomly from the original data. For example, data augmentation may be performed to emulate migrated seismic data and velocity boundaries for different rock facies, differences in layer thicknesses that occur within a formation, and other geological scenarios. Other data augmentation operations may include random null operations that randomly assign a zero value, random shifting operations that shift a range of data values within the data, masking data, and/or rotating data.

While some of data augmentation operations are described as being random, the data augmenting processes may include pseudorandom processes tailored to specific criteria. In some embodiments, for example, data augmentation operations may be a function of a particular geologist's requirements for manipulating the human-picked boundary data.

In Block 530, training data is generated using human-picked boundary data and augmented boundary data in accordance with one or more embodiments. In particular, the combined human-picked boundary data and augmented boundary data may be divided into various subsets for training, prediction, and testing. Likewise, the training data may be further divided among multiple machine-learning epochs.

In some embodiments, a model is trained using multiple machine-learning epochs. For example, a machine-learning epoch may be an iteration of a model through a portion or all of the training data. For example, a single machine-learning epoch may correspond to a specific batch of human-picked boundary data and augmented boundary data, where the training data is divided into multiple batches for multiple epochs. Thus, a model may be trained iteratively using epochs until the model achieves a predetermined level of accuracy in predicting velocity boundaries. Better training of the model which in turn may lead to better predictions for updating the machine-learning model and subsequently a velocity model. Once the training data is passed through all of the epochs and the model is further updated based on the model's predictions of boundary data in each epoch, a trained model may be the final result of the machine-learning algorithm. In some embodiments, multiple trained models are compared and the best trained model is selected accordingly.

In Block 540, a model is trained using training data in accordance with one or more embodiments. For example, various machine-learning algorithms may be used to train the model, such as a supervised learning algorithm. Supervised learning algorithms may include linear regression algorithms, nearest neighbor algorithms, decision trees, etc. In some embodiments, for example, the model is trained using a backpropagation algorithm, such as a Levenberg-Marqardt algorithm.

In Block 550, predicted velocity boundary data is generated using a model in accordance with one or more embodiments. After training, the model may be used to predict velocity boundaries for a migrated seismic image not used during a training period. This velocity model boundary predictions can be from similar geologic environments within the area of interest or even adjacent areas away from the training dataset. Thus, the model may use the predicted boundary data to measure the model's current degree of machine learning.

In Block 560, a model is updated based on an amount of data error in predicted velocity boundary data in accordance with one or more embodiments. Based on the difference between predicted boundary data and actual velocity boundaries in a migrated seismic image, weights and biases within the model may be updated accordingly.

In Block 570, a determination is made whether to train a model using another machine-learning epoch in accordance with one or more embodiments. When a determination is made that no further machine-learning epochs are required for training the model, the process may proceed to Block 580. When a determination is made that one or more machine-learning epochs remain to be performed, the process may return to Block 540.

In Block 580, a trained model is verified based on unused boundary data in accordance with one or more embodiments. Thus, human-picked boundary data or augmented boundary data may be used by a seismic interpreter to determine the trained model's degree of accuracy. For example, different trained models may be used for different types of subterranean formations. Thus, the train model may be analyzed to confirm which types of velocity models may be updated using the predicted velocity boundaries from the trained model. If the verification shows low accuracy, e.g., below a predetermined threshold, Blocks 530-570 may be repeated until a predetermined acceptable accuracy is achieved.

Figure 6:
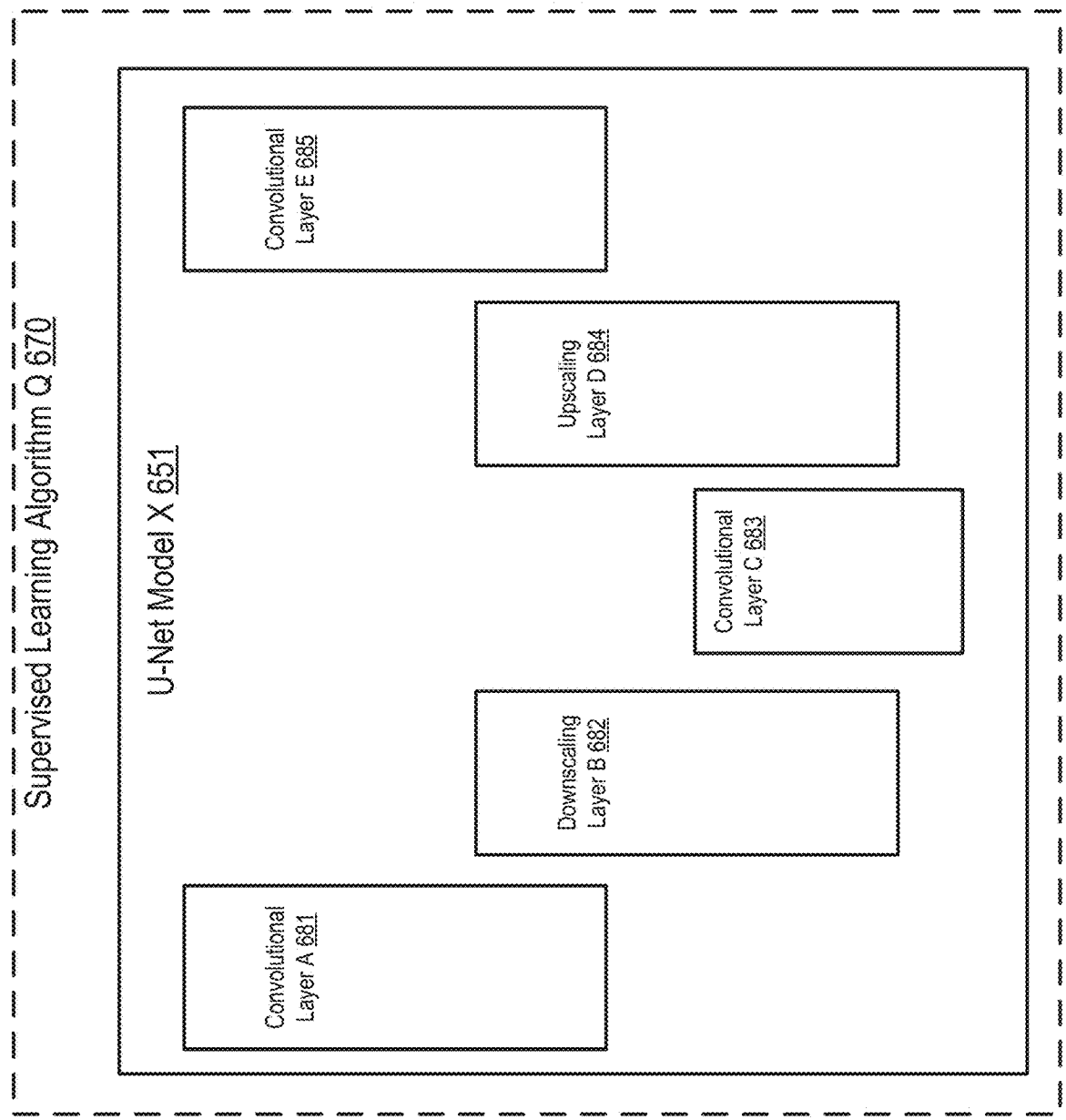
FIG. 6 shows an example in accordance with one or more embodiments.

Turning to FIG. 6, FIG. 6 provides an example of generating a U-Net model to predict velocity boundaries of a subterranean formation. The following example is for explanatory purposes only and not intended to limit the scope of the disclosed technology.

In FIG. 6, a U-Net model X (651) is trained using a supervised learning algorithm Q (670) for predicting velocity boundaries within migrated seismic images (e.g., migrated seismic image X (650)). In particular, the U-Net model X includes five hidden layers, i.e., three convolutional layers (i.e., convolutional layer A (681), convolutional layer C (683), convolutional layer E (685)), a downscaling layer B (682), and an upscaling layer D (684). Moreover, the U-Net model X (651) obtains an image (i.e., migrated seismic image X (650)) as an input for training.

Keeping with FIG. 6, the U-Net model X (651) includes a contracting path (left side) and an expansive path (right side). In the contracting path, the U-Net model X (651) corresponds to a convolutional network architecture, where various rectified linear units (not shown) and max pooling operations (not shown) produce a downsampled description of predetermined features (e.g., a feature map) within the migrated seismic image X (650). As such, feature channels may be increase during the contracting path. In the expansive path, a feature map is upsampled that decreases the number of feature channels. At the final layer (i.e., convolutional layer E (685), the resulting feature map is associated with a desired number of classes that describe velocity boundaries within the velocity boundary map Y (656).

Figure 7A:
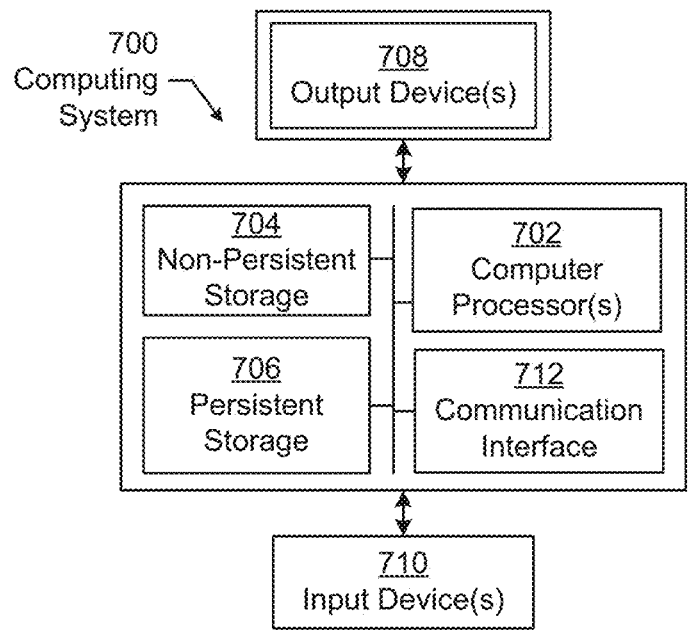
FIGS. 7A and 7B show a computing system in accordance with one or more embodiments.

Embodiments may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 7B:
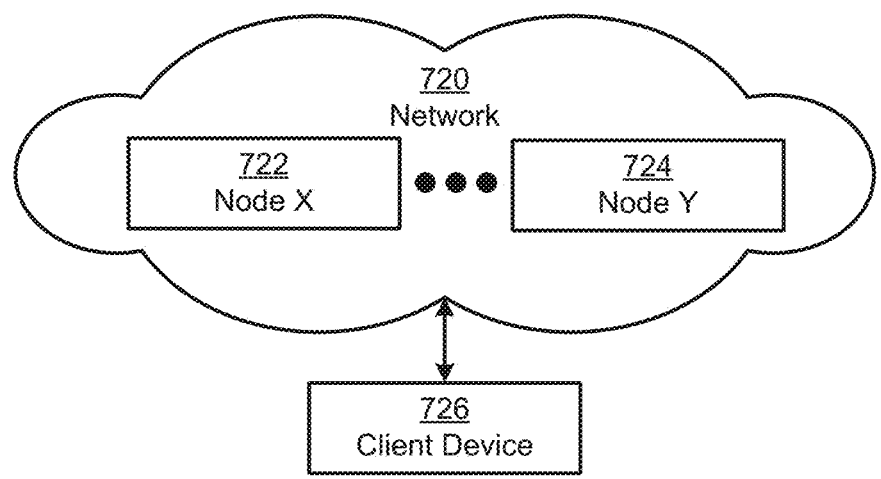

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the disclosure.

The computing system or group of computing systems described in FIGS. 7A and 7B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (700) in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A—B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7A and the nodes and/or client device in FIG. 7B.

Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
    obtaining, by a computer processor, an initial velocity model regarding a subterranean formation of interest;
    generating, by the computer processor, a plurality of seismic migration gathers with different cross-correlation lag values based on a migration-velocity analysis and the initial velocity model;
    selecting, by the computer processor, a predetermined cross-correlation lag value automatically using the plurality of seismic migration gathers and based on a predetermined criterion;
    determining, by the computer processor, a plurality of velocity boundaries within the initial velocity model using a trained model, wherein the trained model is trained by first human-picked boundary data and augmented boundary data;
    updating, by the computer processor, the initial velocity model using the plurality of velocity boundaries, the automatically-selected cross-correlation lag value, and the migration-velocity analysis to produce an updated velocity model; and
    generating, by the computer processor, an image of the subterranean formation of interest using the updated velocity model.

2. The method of claim 1,
    wherein the trained model is a convolutional neural network comprising a plurality of convolutional layers, at least one downscaling layer, and at least one upscaling layer,
    wherein the trained model obtains a migrated seismic image as an input, and
    wherein the trained model generates a velocity boundary map as an output.

3. The method of claim 1,
    wherein the different cross-correlation lag values are based on a travel time inversion process that is performed using ray tracing, one-way wave-equation tomography, or two-way wave-equation tomography.

4. The method of claim 1, further comprising:
    performing a smoothing function on the plurality of seismic migration gathers to produce a plurality of smoothed migration gathers,
    wherein the predetermined criterion for selecting the predetermined cross-correlation lag value is a maximum amplitude within the plurality of smoothed migration gathers.

5. The method of claim 1,
    wherein the augmented boundary data comprises a second human-picked boundary data that is augmented using a rotation operation,
    wherein a training dataset comprises the first human-picked boundary data and the augmented boundary data,
    wherein the trained model is trained using a plurality of machine-learning epochs, and
    wherein a respective machine-learning epoch among the plurality of machine-learning epochs trains the trained model using a portion of the training dataset.

6. The method of claim 1,
    wherein the migration-velocity analysis is a one-way wave-equation tomographic operation.

7. The method of claim 1, further comprising:
    determining one or more salt bodies in the image of the subterranean formation of interest,
    wherein the one or more salt bodies correspond to the plurality of velocity boundaries.

8. The method of claim 1, further comprising:
    acquiring, using a seismic surveying system, seismic data regarding the subterranean formation of interest; and
    generating the initial velocity model using the seismic data and a seismic inversion operation.

9. A method, comprising:
    obtaining, by a computer processor, first human-picked boundary data that describes a first plurality of velocity boundaries within a first migrated seismic image;
    obtaining, by the computer processor, augmented boundary data that describes a second plurality of velocity boundaries within a second migrated seismic image, wherein the augmented boundary data is generated from second human-picked boundary data using an augmentation operation;
    generating, by the computer processor, a trained model using a plurality of machine-learning epochs and training data comprising the first human-picked boundary data and the augmented boundary data; and
    determining, by the computer processor, one or more velocity boundaries using the trained model and migrated seismic data.

10. The method of claim 9,
    wherein the trained model is a convolutional neural network comprising a plurality of convolutional layers, at least one downscaling layer, and at least one upscaling layer,
    wherein the trained model obtains a third migrated seismic image as an input, and
    wherein the trained model generates a velocity boundary map as an output.

11. The method of claim 9, further comprising:
    obtaining a third human-picked boundary data,
    wherein the trained model is updated during the plurality of machine-learning epochs based on a comparison between at least a portion of the third human-picked boundary data and predicted boundary data that is generated by the trained model.

12. The method of claim 9,
wherein the plurality of machine-learning epochs are training iterations for the trained model, and
wherein a respective machine-learning epoch among the plurality of machine-learning epochs trains the trained model using a predetermined portion of the training data.

13. The method of claim 9,
wherein the augmentation operation is selected from a group consisting of: a rotation operation, a shifting operation, a cut operation, an intrusion operation, and a deformation operation.

14. A non-transitory computer readable medium storing instructions executable by a computer processor, the instructions comprising functionality for:
obtaining an initial velocity model regarding a subterranean formation of interest;
generating a plurality of seismic migration gathers with different cross-correlation lag values based on a migration-velocity analysis and the initial velocity model;
selecting a predetermined cross-correlation lag value automatically using the plurality of seismic migration gathers and based on a predetermined criterion;
determining a plurality of velocity boundaries within the initial velocity model using a trained model, wherein the trained model is trained by human-picked boundary data and augmented boundary data;
updating the initial velocity model using the plurality of velocity boundaries, the automatically-selected cross-correlation lag value, and the migration-velocity analysis to produce an updated velocity model; and
generating an image of the subterranean formation of interest using the updated velocity model.

15. The non-transitory computer readable medium of claim 14, wherein the instructions further comprise functionality for:
performing a smoothing function on the plurality of seismic migration gathers to produce a plurality of smoothed migration gathers,
wherein the predetermined criterion for selecting the predetermined cross-correlation lag value is a maximum amplitude within the plurality of smoothed migration gathers.

16. The non-transitory computer readable medium of claim 14,
wherein the trained model is a convolutional neural network comprising a plurality of convolutional layers, at least one downscaling layer, and at least one upscaling layer,
wherein the trained model obtains a migrated seismic image as an input, and
wherein the trained model generates a velocity boundary map as an output.

17. The non-transitory computer readable medium of claim 14,
wherein the migration-velocity analysis is a one-way wave-equation traveltime tomographic operation.

18. The non-transitory computer readable medium of claim 14, wherein the instructions further comprise functionality for:
determining one or more salt bodies in the image of the subterranean formation of interest,
wherein the one or more salt bodies correspond to the plurality of velocity boundaries.

19. The non-transitory computer readable medium of claim 14, wherein the instructions further comprise functionality for:
obtaining seismic data for the subterranean formation of interest; and
generating the initial velocity model using the seismic data and a seismic inversion operation.

\* \* \* \* \*